US009151895B2

(12) United States Patent
Miller et al.

(10) Patent No.: US 9,151,895 B2
(45) Date of Patent: Oct. 6, 2015

(54) THERMAL REMOVAL OF OPTICAL FIBER COATINGS BY INSERTION THROUGH HEATED FERRULES TO FORM FERRULE ASSEMBLIES FOR FIBER OPTIC CONNECTORS, AND RELATED ASSEMBLIES (71) Applicant: Corning Cable Systems LLC, Hickory, NC (US)

(72) Inventors: Darrin Max Miller, Hickory, NC (US); Dennis Craig Morrison, Lincolnton, NC (US); Kipp David Yeakel, Waverly, NY (US)

(73) Assignee: Corning Cable Systems LLC, Hickory, NC (US)

( * ) Notice: Subject to any disclaimer, the term of this patent is extended or adjusted under 35 U.S.C. 154(b) by 303 days.

(21) Appl. No.: 13/873,824

(22) Filed: Apr. 30, 2013

(65) Prior Publication Data
US 2014/0321811 A1    Oct. 30, 2014

(51) Int. Cl.
*G02B 6/36* (2006.01)
*G02B 6/245* (2006.01)
*G02B 6/38* (2006.01)
*G02B 6/02* (2006.01)
*H05B 6/10* (2006.01)

(52) U.S. Cl.
CPC .............. *G02B 6/245* (2013.01); *G02B 6/3833* (2013.01); *G02B 6/02395* (2013.01); *H05B 6/105* (2013.01)

(58) Field of Classification Search
None
See application file for complete search history.

(56) References Cited

U.S. PATENT DOCUMENTS

| 3,861,781 | A | * | 1/1975 | Hasegawa et al. | 385/80 |
| 4,135,781 | A | * | 1/1979 | Archer | 385/78 |
| 4,158,477 | A | * | 6/1979 | Phillips et al. | 385/95 |
| 4,168,109 | A | * | 9/1979 | Dumire | 385/60 |
| 4,510,005 | A | * | 4/1985 | Nijman | 156/221 |
| 5,968,283 | A | | 10/1999 | Walraven et al. | 134/19 |
| 6,128,927 | A | * | 10/2000 | Ahrens et al. | 65/392 |
| 8,480,311 | B2 | | 7/2013 | Ohtsuka et al. | 385/78 |
| 2010/0220960 | A1 | * | 9/2010 | Ohtsuka et al. | 385/72 |

(Continued)

FOREIGN PATENT DOCUMENTS

| JP | 5450343 A | | 4/1979 | G02B 5/14 |
| JP | 61-26010 A | * | 2/1986 | G02B 6/38 |
| JP | 2010266822 A | | 11/2010 | G02B 6/36 |

(Continued)

OTHER PUBLICATIONS

Patent Cooperation Treaty International Search Report, Application No. PCT/US2014/035290, Sep. 18, 2014, 4 pages.

*Primary Examiner* — Mike Stahl (57) ABSTRACT

Thermal removal of optical fiber coatings by insertion through heated ferrules to form ferrule assemblies for fiber optic connectors, and related assemblies are disclosed. An optical fiber includes a glass fiber, having a cladding and core, surrounded by a protective coating. By removing the coating at an end portion of the optical fiber, the end portion may be precisely positioned and secured within a ferrule to enable reliable optical communications. The coating may be thermally removed, or substantially thermally removed, by inserting the optical fiber through a rear opening of the ferrule which has been heated above a temperature sufficient to change the coating to a non-solid state. In this manner, the coating may be efficiently removed from the end portion of the optical fiber while being inserted into the ferrule bore of the ferrule to enable efficient forming of a ferrule assembly for a fiber optic connector.

19 Claims, 5 Drawing Sheets

(56) References Cited

U.S. PATENT DOCUMENTS

2012/0128303 A1  5/2012  Koyama et al. ............ 385/60
2013/0343709 A1  12/2013  Danley et al. ............ 385/81

FOREIGN PATENT DOCUMENTS

| JP | 2011-2821 A | 1/2011 | ............ G02B 6/00 |
| JP | 201315790 A | 1/2013 | ............ G02B 6/36 |

* cited by examiner

THERMAL REMOVAL OF OPTICAL FIBER COATINGS BY INSERTION THROUGH HEATED FERRULES TO FORM FERRULE ASSEMBLIES FOR FIBER OPTIC CONNECTORS, AND RELATED ASSEMBLIES

BACKGROUND

The disclosure relates generally to fiber optic connectors, and more particularly to removing polymer coatings overlaying optical fibers, which may be used when preparing the optical fibers for attachment in ferrules of the fiber optic connectors.

Benefits of optical fibers include extremely wide bandwidth and low noise operation. In cases where high bandwidth is required between two interconnection locations, fiber optic cables having fiber optic connectors may be used to communicate information between these locations. The fiber optic connectors may be used to conveniently connect and disconnect the fiber optic cables from the interconnection locations, for example, to facilitate maintenance and upgrades.

Fiber optic connectors include a ferrule assembly having a ferrule. The ferrule has several purposes. The ferrule includes an internal pathway, called a ferrule bore, through which an optical fiber is supported and protected. The ferrule bore also includes an opening at an end face of the ferrule. The opening is where an optical core of an end portion of the optical fiber may be located to be aligned to an end portion of another optical fiber of a complementary connector. The optical core may be as small as eight (8) microns, such that the end portions of the optical fibers need to be precisely aligned to establish an optical connection.

The optical fibers typically include a glass fiber (e.g., cladding and optical core) surrounded by a protective polymer coating, which is removed from an end portion of an optical fiber prior to being disposed within the ferrule bore of the ferrule. This is because the polymer coatings do not currently have the robust mechanical properties necessary to be attached to the ferrule bore to withstand the cyclical tension experienced during the use of the fiber optic optic connector over time without displacement creep or breakage. Also, the glass fiber of the optical fiber is not centered within the polymer coating with sufficient accuracy to permit the glass fiber to be precisely located within the ferrule bore without removing the coating. For at least these reasons, the coating is removed from the end portion of the optical fiber prior to being disposed in a ferrule.

Various methods are available to remove the coating from an optical fiber, including hot gas stripping, mechanical stripping, chemical stripping, and laser stripping. All of these methods have drawbacks. Hot-gas stripping uses a heated jet of gas (e.g., nitrogen or air) to melt and remove the coating, but considerable debris is often created. The hot-gas stripping approach may also incompletely evaporate the coating, and/or may overheat heat-sensitive materials in close proximity to the fiber core.

Mechanical stripping of optical fibers includes physically removing the coating material from the glass fiber with a semi-sharp edge of a stripping blade made of a metal or a polymer, as may be similar to mechanical stripping of electrical wires. However, mechanical stripping may have issues because the optical fiber may be damaged, and stripping blades are needed that require time-consuming inspection and replacement procedures. Chemical stripping of optical fibers uses chemicals to dissolve the coating from the glass portion of the optical fiber, but these chemicals require extensive procedures to protect the environment and safety measures to protect personnel.

Laser stripping utilizes one or more laser beams to strip the coating from glass optical fibers typically using a vaporization or ablation process as laser energy is absorbed by the polymer coatings. In order to remove the coatings around a circumference of the optical fiber the laser energy must be distributed around the circumference which, typically requires added complexity and cost. For example, complex three-dimensional mirrors may be utilized, or the optical fiber may be moved relative to a laser beam using specialized equipment.

In addition, once coating is removed from an end portion of an optical fiber using any of the above-mentioned methods, the optical fiber is vulnerable to damage. A stripped portion of an optical fiber may be damaged merely by being in contact with particulates which could scratch or damage an exterior surface of the optical fiber where coating has been removed. Any coating stripping process completed prior to insertion of the optical fiber into a ferrule must be managed carefully so that the stripped portion of the optical fiber is not damaged prior to being protected within the ferrule.

What is desired is a more cost-effective and efficient method to prepare an end portion of an optical fiber for terminating into a ferrule so that the end portion is coupled to the ferrule and the coating of the end portion of the optical fiber is removed or substantially removed. The method and associated equipment should remove the coating from the end portion of the optical fiber while minimizing damage to the optical fiber. The method should also be efficient, inexpensive, and not require unsafe chemicals.

SUMMARY

Embodiments disclosed herein include thermal removal of optical fiber coatings by insertion through heated ferrules to form ferrule assemblies for fiber optic connectors, and related assemblies. An optical fiber includes a glass fiber, having a cladding and core, surrounded by a protective coating. By removing the coating at an end portion of the optical fiber, the end portion may be precisely positioned and secured within a ferrule to enable reliable optical communications. The coating may be thermally removed, or substantially thermally removed, by inserting the optical fiber through a rear opening of the ferrule which has been heated above a temperature sufficient to change the coating to a non-solid state. In this manner, the coating may be efficiently removed from the end portion of the optical fiber while being inserted into the ferrule bore of the ferrule to enable efficient forming of a ferrule assembly for a fiber optic connector.

In this regard, in one embodiment, a method of terminating an optical fiber at a ferrule to create a ferrule assembly for a fiber optic connector is provided. The method comprises providing a ferrule at an initial temperature, the ferrule comprising a ferrule bore extending from a rear opening to a front opening. The method also comprises heating the ferrule above the initial temperature with a heating device. The method also comprises inserting a coated end portion of an optical fiber through the rear opening of the ferrule bore while the ferrule is heated above the initial temperature sufficient to change a coating on the coated end portion of the optical fiber to a non-solid state, thermally removing or substantially thermally removing the coating from the coated end portion of the optical fiber passing through the rear opening of the ferrule. In this manner, manufacturing time is reduced as conventional coating removal processes, such as mechanical stripping with stripping blades, are no longer required.

In another embodiment, a ferrule assembly for a fiber optic connector is provided. The ferrule assembly comprises a ferrule comprising a ferrule bore extending from a rear opening to a front opening. The ferrule assembly also comprises a support body disposed outside and adjacent to the rear opening. The ferrule assembly also comprises an optical fiber coupled to the ferrule. The optical fiber comprises a coated portion disposed outside the ferrule and extending to the rear opening of the ferrule. The optical fiber also comprises an end portion disposed within the ferrule bore and extending from the rear opening of the ferrule to the front opening. At least twenty-five (25) percent of an exterior surface of a glass portion of the end portion of the optical fiber is free of coating. The coating of the coated portion of the optical fiber is attached to the support body and comprises a same material composition. In this manner, the optical fiber may be securely coupled to the ferrule and attenuation may be reduced.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed herein include thermal removal of optical fiber coatings by insertion through heated ferrules to form ferrule assemblies for fiber optic connectors, and related assemblies. An optical fiber includes a glass fiber, having a cladding and core, surrounded by a protective coating. By removing the coating at an end portion of the optical fiber, the end portion may be precisely positioned and secured within a ferrule to enable reliable optical communications. The coating may be thermally removed, or substantially thermally removed, by inserting the optical fiber through a rear opening of the ferrule which has been heated above a temperature sufficient to change the coating to a non-solid state. In this manner, the coating may be efficiently removed from the end portion of the optical fiber while being inserted into the ferrule bore of the ferrule to enable efficient forming of a ferrule assembly for a fiber optic connector.

With regard to securing an end portion of an optical fiber within a ferrule, it has been discovered that coating may be thermally removed from the end portion as it is inserted through a rear opening of a ferrule heated above a temperature sufficient to change the coating to a non-solid state. Coatings are removed because the glass portion of the optical fiber must be located with sufficient accuracy in order to establish optical communications when a part of a fiber optic connector. The coating surrounding the glass portion of the optical fiber often does not have sufficient concentricity with respect to the glass portion of the optical fiber to accurately determine the location of the optical core. The coatings also are typically not strong enough to secure the end portion of the optical fiber without axial movement along the optical axis of the ferrule as the optical fiber is subject to axial forces during connections and disconnections with other optical fibers as part of a fiber optic connector. Accordingly, by thermally removing the coating from the end portion, the optical fiber may be securely and precisely located to the ferrule by forming a direct abutment between the glass portion of the optical fiber and an inner surface of the ferrule. In this manner, conventional processes to remove the coating from the end portion of the optical fiber prior to being inserted into the ferrule may be eliminated to save time and reduce redundancy.

Figure 4A:
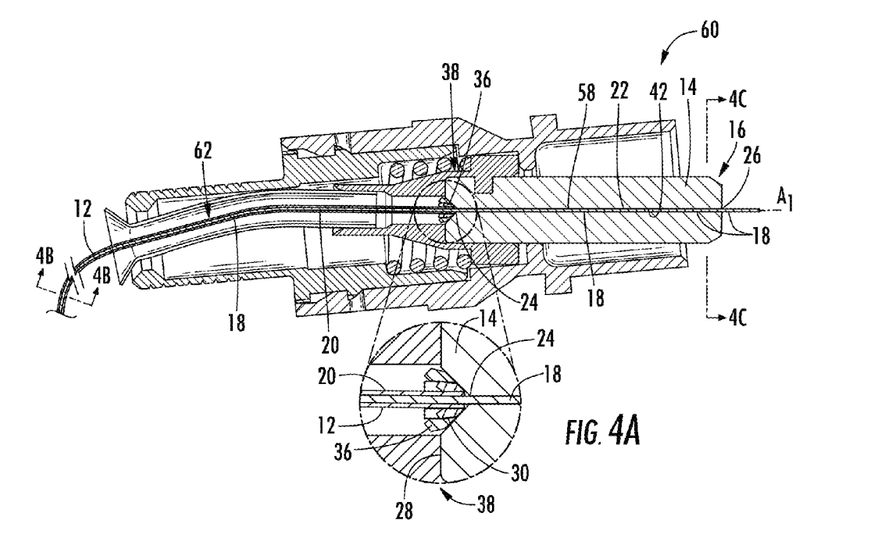
FIG. 4A is a cutaway view and a cutaway close-up view along the optical axis $A_1$ of the ferrule assembly of FIG. 3D including the ferrule coupled to the optical fiber as part of an exemplary fiber optic connector sub-assembly, illustrating a coated portion of the optical fiber disposed outside the ferrule and the end portion disposed within the ferrule and extending from the rear opening of the ferrule with the coating removed or substantially removed, consistent with the process of FIG. 2.
Figure 4B:
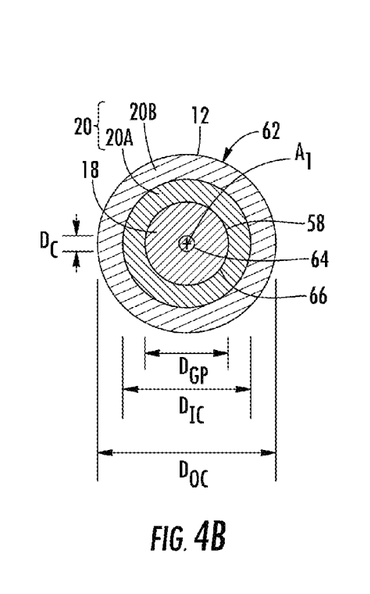
FIG. 4B is a cutaway view orthogonal to the optical axis $A_1$ of the coated portion of the optical fiber of FIG. 4A showing a glass portion surrounded by a coating comprising at least one layer of the coating.
Figure 4C:
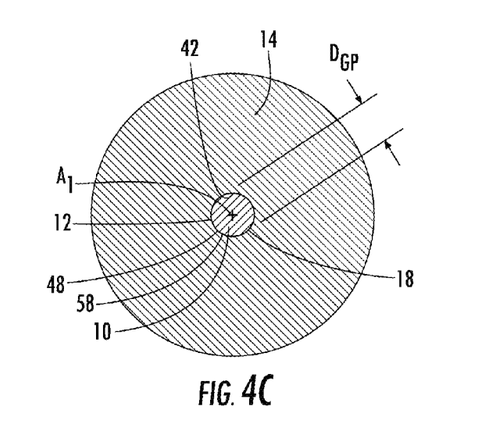
FIG. 4C is a cutaway view parallel to the optical axis $A_1$ of the ferrule assembly of FIG. 4A showing the end portion of the optical fiber disposed within the ferrule with the coating thermally removed or substantially thermally removed, consistent with the process of FIG. 2.

In this regard, this disclosure is organized in sections. First, FIGS. 1A and 1B will be utilized to introduce the concept of inserting an optical fiber into a heated ferrule to thermally remove coating from the end portion of the optical fiber. Next, a flowchart in FIG. 2 is discussed as part of an exemplary process of terminating an optical fiber at a ferrule to create a ferrule assembly for a fiber optic connector in relation to related process details depicted in FIGS. 3A through 3D. Then, FIGS. 4A through 4C are introduced to show a fiber optic connector sub-assembly utilizing a ferrule assembly consistent with the exemplary process of FIG. 2. Next, FIGS. 5A and 5B will be discussed to describe another embodiment of the process of FIG. 2 wherein induction heating is utilized to heat the ferrule. Finally, FIGS. 6A and 6B will be discussed to describe yet another embodiment of the process of FIG. 2, wherein laser energy is utilized to heat the ferrule.

Figure 1A:
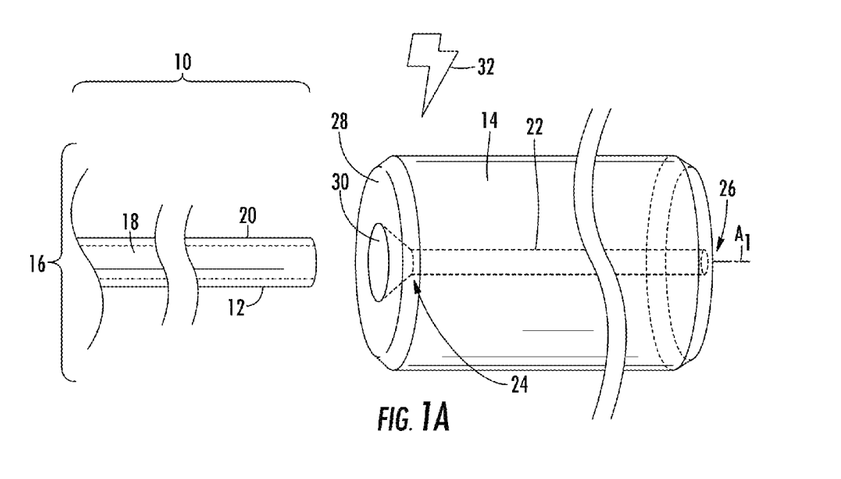
FIG. 1A is a side perspective view of a coated end portion of an optical fiber adjacent to a rear opening of a ferrule bore of a heated ferrule to illustrate the optical fiber before insertion into the ferrule to terminate the optical fiber in the ferrule.
Figures 2, 3A, 3B, 3C, 3D:
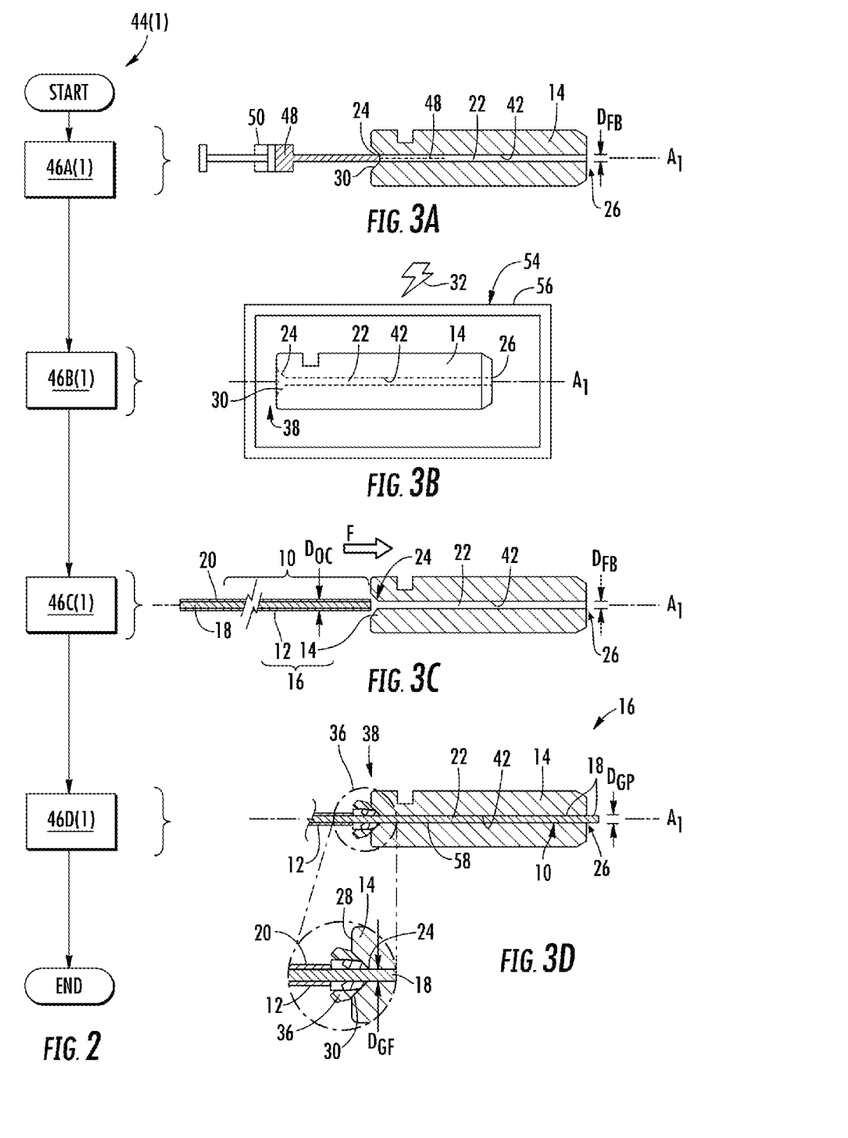
FIG. 2 is a flowchart diagram of an exemplary process of terminating an optical fiber at a ferrule to create a ferrule assembly for a fiber optic connector by inserting the coated end portion of the optical fiber into the ferrule bore through the rear opening of the heated ferrule to remove the coating at the end portion of the optical fiber.
FIG. 3A is a cutaway view along an optical axis $A_1$ of the ferrule of FIG. 1A provided at an initial temperature with epoxy being optionally inserted into a ferrule bore of the ferrule, according to the exemplary process of FIG. 2.
FIG. 3B is a cutaway view along the optical axis $A_1$ of the ferrule of FIG. 3A being heated above the initial temperature, according to the exemplary process of FIG. 2.
FIG. 3C is a cutaway view along the optical axis $A_1$ of the ferrule of FIG. 3B that has been heated above the initial temperature adjacent to the optical fiber of FIG. 1A, illustrating a force being applied to the end portion of the optical fiber to insert the end portion into the rear opening of the ferrule, according to the exemplary process of FIG. 2.
FIG. 3D is a cutaway view and a close-up view along the optical axis $A_1$ of a ferrule assembly formed from the ferrule of FIG. 3C, with the end portion of the optical fiber of FIG. 3C inserted through the ferrule, according to the exemplary process of FIG. 2, and illustrating the coating thermally removed or substantially thermally removed from the end portion.

In this regard, FIG. 1A is a side perspective view of a coated end portion 10 of an optical fiber 12 adjacent to a rear opening 24 of a ferrule 14 to which it will be terminated to create a ferrule assembly 16. The end portion 10 of the optical fiber 12 includes a glass portion 18 surrounded by a coating 20. The glass portion 18 may comprise silica to provide efficient transmission of light through the optical fiber 12, but is vulnerable damage. The coating 20 protects the optical fiber 12 outside of the ferrule 14. The ferrule 14 includes a ferrule bore 22 extending from the rear opening 24 to a front opening 26 of the ferrule 14, which is configured to hold the end portion 10 of the optical fiber 12 with the coating 20 removed. Specifically, the ferrule bore 22 may be used to precisely position and securely hold the glass portion 18 of the optical fiber 12 within a fiber optic connector (shown later in FIG. 4A) so that optical communications may be established. The ferrule 14 may include at least one rear surface 28 to form a cone-shaped volume 30 to guide the end portion 10 of the optical fiber 12 into the ferrule bore 22.

It is also noted that the ferrule 14 of FIG. 1A has been heated by energy 32 to a temperature sufficient to change the coating 20 of the end portion 10 of the optical fiber 12 to a non-solid state. The energy 32 may heat the ferrule 14 while minimizing damage to the ferrule 14 and the optical fiber 12. For example, the energy 32 may be transferred using conduction heat transfer, radiant heat transfer, and/or convection heat transfer. In one embodiment, the ferrule 14 may be heated by induction.

Figure 1B:
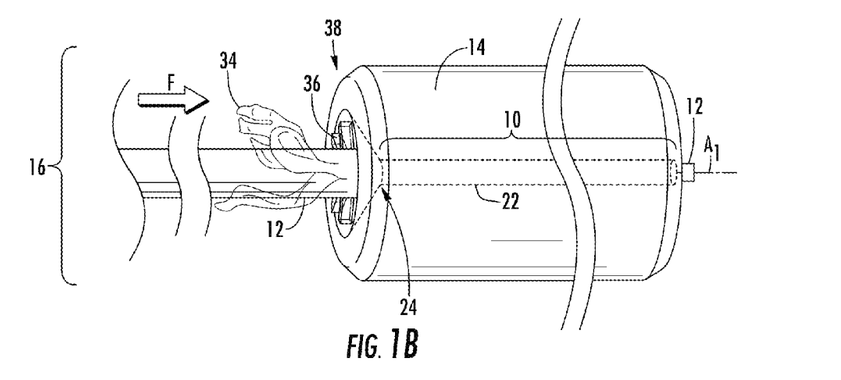
FIG. 1B is a side perspective view of the coated end portion of the optical fiber of FIG. 1A being inserted into the ferrule bore through the rear opening of the heated ferrule, illustrating the coating of the end portion of the optical fiber being thermally removed or substantially thermally removed as the optical fiber passes through the rear opening of the heated ferrule.

FIG. 1B is a side perspective view of the coated end portion 10 of the optical fiber 12 of FIG. 1A after being inserted through the rear opening 24 of the ferrule 14 with a force F. The coating 20 of the end portion 10 of the optical fiber 12 is shown as being thermally removed or substantially thermally removed as the end portion 10 of the optical fiber 12 passes through the rear opening 24 of the ferrule 14, which has been heated. In the embodiment shown in FIG. 1B, the coating 20 removed from the end portion 10 may be partially converted to a gas 34, oxidized, and/or partially melted to form a support body 36. The support body 36 may provide protection from harmful bending as the optical fiber 12 extends from the rear end 38 of the ferrule 14.

The end portion 10 of the optical fiber 12 with the coating 20 thermally removed, or substantially thermally removed, is disposed within the ferrule 14 and extends from the rear opening 24 through the ferrule bore 22 of the ferrule 14. The end portion 10 may also extend through the front opening 26 of the ferrule 14. The end portion 10 of the optical fiber 12 extending from the front opening 26 may be, for example, mechanically polished (not shown) to be flush with the front end 40 of the ferrule 14. The end portion 10, with the coating 20 removed or substantially removed, is securely attached to the inner surface 42 of the ferrule 14 without interference of the coating 20, which would otherwise not permit the optical fiber 12 to be secured to the ferrule 14 with the strength needed to withstand cyclical stresses experienced by a fiber optic connector. Also, with the coating 20 removed, the glass portion 18 of the end portion 10 of the optical fiber 12 may be more precisely located relative to the ferrule 14 because the glass portion 18 of the end portion 10 of the optical fiber 12 may not be centered within the coating 20 with sufficient accuracy. In this manner, the optical fiber 12 may be secured and precisely located to the ferrule 14 to form a ferrule assembly 16, thereby enabling reliable optical communications when assembled as part of a fiber optic connector (FIG. 4A).

Now that the optical fiber 12 and the ferrule 14 have been introduced, as well as the concept of thermally removing coating 20 from the end portion 10 of the optical fiber 12, an exemplary process 44(1) to provide the ferrule assembly 16 for a fiber optic connector is discussed. In this regard, FIG. 2 is a flowchart diagram of the exemplary process 44(1) of providing the ferrule assembly 16 for the fiber optic connector. The process 44(1) in FIG. 2 will be described using terminology and information provided above. FIGS. 3A-3D correspond with blocks 46A(1), 46B(1), 46C(1), and 46D(1), respectively, in FIG. 2, and will be discussed together.

FIG. 3A is a cutaway view along an optical axis $A_1$ of the ferrule 14 of FIG. 1A, illustrating providing the ferrule 14 comprising the ferrule bore 22 extending from the rear opening 24 to the front opening 26 at an initial temperature (block 46A(1) in FIG. 2). The ferrule 14 may comprise zirconia for strength. The initial temperature may be ambient temperature, for example, twenty (20) degrees Celsius. The ferrule bore 22 may be formed by an inner surface 42 of the ferrule 14 extending from the rear opening 24 to the front opening 26. The ferrule bore 22 may have a diameter $D_{FB}$ (or width) corresponding to approximately a diameter $D_{GP}$ (or width) of the glass portion 18 of the optical fiber 12. In one embodiment, the diameter $D_{FB}$ of the ferrule bore 22 may be within ten (10) nanometers of the diameter $D_{GP}$ of the glass portion 18 of the optical fiber 12. In this manner, the glass portion 18 of the end portion 10 may be better secured to the inner surface 42 of the ferrule 14 when the coating 20 is thermally removed, or substantially thermally removed, from the glass portion 18 at the end portion 10 of the optical fiber 12.

It is noted that the ferrule 14 may be provided with a bonding agent 48 optionally inserted into the ferrule bore 22. In one embodiment shown in FIG. 3A, the bonding agent 48 may be inserted into the ferrule bore 22 with a syringe 50. The bonding agent 48 may be inserted through the rear opening 24 and/or the front opening 26 to be disposed in at least a portion of the ferrule bore 22. The bonding agent 48 may be, for example, an epoxy 52. In this manner, the end portion 10 of the optical fiber 12 may be better secured within the ferrule 14 and thereby more resistant to movement which may cause attenuation.

As depicted in FIG. 3B, the process 44(1) may comprise heating the ferrule 14 above the initial temperature with a heater device 54 (block 46B(1) in FIG. 2). The heater device 54 may be in one embodiment an oven 56, which may heat the ferrule 14 with the energy 32. The ferrule 14 may be heated above an elevated temperature sufficient to change the coating 20 on the coated end portion 10 of the optical fiber 12 to a non-solid state. For example, the elevated temperature may be three-hundred (300) degrees Celsius, and the coating 20 may comprise acrylate. The elevated temperature may thereby thermally remove, or substantially thermally remove, the coating 20 from the coated end portion 10 of the optical fiber 12 passing through the rear opening 24 of the ferrule 14. In this manner, the energy 32 to thermally remove the coating 20 is transferred to the ferrule 14 to be made available to thermally remove the coating 20 of the optical fiber 12.

FIG. 3C is a cutaway view along the optical axis $A_1$ of the ferrule 14 of FIG. 3B, illustrating a force F being applied to the coated end portion 10 of the optical fiber 12 to thereby insert the end portion 10 into the rear opening 24 of the ferrule 14 (block 46C(1) in FIG. 2). The force F may be, for example, less than two (2) pounds and applied manually or by an automated actuator (not shown). The diameter $D_{OC}$ (or width) of the coated end portion 10 of the optical fiber 12 may be greater than the diameter $D_{FB}$ of the ferrule bore 22. In this manner, the coating 20 of the end portion 10 may be pushed away from the end portion 10 as the coating 20 is thermally removed, or substantially thermally removed, from the end portion 10 of the optical fiber 12.

FIG. 3D depicts a cutaway view and a close-up view along the optical axis $A_1$ of the ferrule assembly 16, formed from the ferrule 14 of FIG. 3C with the end portion 10 of the optical fiber 12 of FIG. 3C disposed through the ferrule 14 (block 46D(1) in FIG. 2). Specifically, the coating 20 has been thermally removed, or substantially thermally removed, from the end portion 10 of the optical fiber 12. As used herein, substantially thermally removed means that at least twenty-five (25) percent of an exterior surface 58 of the glass portion 18 of the end portion 10 of the optical fiber 12 within the ferrule bore 22 is free of coating 20. It is also believed that having more than fifty (50) percent, and more than seventy-five (75) percent of the exterior surface 58 of the glass portion 18 of the end portion 10 of the optical fiber 12 to be free of coating 20 is also possible. In this manner, the glass portion 18 of the end portion 10 of the optical fiber 12 within the ferrule bore 22 may be secured to the ferrule 14, for example, with the bonding agent 48, to minimize attenuation caused by movement of the optical fiber 12 within the ferrule 14.

As the coating 20 is removed from the end portion 10 of the optical fiber 12, the support body 36 may be formed outside and adjacent to the rear opening 24 of the ferrule 14. The support body 36 may comprise coating 20 which may be partially converted to a gas 34, oxidized, and/or partially melted. The support body 36 may at least partially occupy the cone-shaped volume 30 formed by the at least one rear surface 28. In this manner, the support body 36 may protect the optical fiber 12 from harmful bending as the optical fiber 12 extends from the rear end 38 of the ferrule 14.

It is noted that, unless expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

Now that the optical fiber 12, the ferrule 14, and the process 44(1) to terminate the optical fiber 12 at the ferrule 14 to create the ferrule assembly 16 for a fiber optic connector have been introduced above, a fiber optic connector sub-assembly 60, including the ferrule assembly 16 created by the exemplary process 44(1), is now discussed. In this regard, FIG. 4A is a cutaway view along the optical axis $A_1$ of the ferrule assembly 16 of FIG. 3D. The ferrule assembly 16 comprises the ferrule 14 coupled to the optical fiber 12 as part of the exemplary fiber optic connector sub-assembly 60.

Consistent with the discussion above for FIGS. 1A-3D, the ferrule assembly 16 of the fiber optic connector sub-assembly 60 comprises the ferrule 14 comprising the ferrule bore 22 extending from the rear opening 24 to the front opening 26. The ferrule assembly 16 also comprises the support body 36 disposed outside and adjacent to the rear opening 24. The ferrule assembly 16 also comprises the glass portion 18 of the optical fiber 12 secured to the ferrule 14. The optical fiber 12 may be secured to the ferrule 14 with the bonding agent 48. The optical fiber 12, comprising a coated portion 62 of the optical fiber 12, is disposed outside the rear opening 24 of the ferrule 14. The optical fiber 12 also comprises the end portion 10 of the optical fiber 12 disposed within the ferrule 14 and extending within the ferrule bore 22 from the rear opening 24 of the ferrule 14 to the front opening 26 of the ferrule 14. At least twenty-five (25) percent of the exterior surface 58 of the glass portion 18 of the end portion 10 of the optical fiber 12 within the ferrule bore 22 is free of the coating 20.

Features of the optical fiber 12 make thermal removal efficient. In this regard, FIG. 4B is a cutaway view orthogonal to the optical axis $A_1$ of the coated portion 62 of the optical fiber 12 of FIG. 4A, showing the glass portion 18 surrounded by a coating 20 comprising at least an inner coating layer 20A and an outer coating layer 20B. First we will discuss the glass portion 18 before discussing the coating 20.

According to an exemplary embodiment, the optical fiber 12 is a glass optical fiber configured for high-speed data communication via the transmission of electromagnetic radiation (e.g., light). In some such embodiments, the optical fiber 12 is a germanium-doped silica glass fiber having the glass portion 18 that includes a glass core 64 and glass cladding 66. The glass core 64 may include a diameter $D_C$, for example, in a range from eight (8) microns to 62.5 microns. The glass cladding 66 forms the exterior surface 58 of the glass portion 18 of the optical fiber 12, and may comprise a diameter $D_{GP}$, for example, of one-hundred twenty-five (125) microns.

With continued reference to FIG. 4B, the inner coating layer 20A may be a softer, more rubbery material than the outer coating layer 20B. The inner coating layer 20A may extend, for example, from the glass portion 18 to a diameter $D_{IC}$ of one-hundred ninety (190) microns. In this manner, the inner coating layer 20A provides cushioning to the glass portion 18 of the optical fiber 12 to protect against external mechanical loads. The inner coating layer 20A may also thereby enable the coating 20 to be more easily removed from the glass portion 18 of the optical fiber 12. The outer coating layer 20B may comprise a different material composition than the inner coating layer 20A, resulting in a stiffer material than the inner coating layer 20A that protects the optical fiber 12 from abrasions and environmental exposure. The outer coating layer 20B may extend, for example, from the inner coating layer 20A to a diameter $D_{OC}$ of two-hundred fifty (250) microns. The inner coating layer 20A and the outer coating layer 20B may comprise a polymer material that includes acrylate, and may be at least twenty (20) microns thick or more to protect the exterior surface 58 of the glass portion 18 of the optical fiber 12. When the optical fiber 12 approaches the rear opening 24 of the ferrule 14, the coating 20 may be heated by the ferrule 14 to change the inner coating layer 20A to a non-solid state and/or thermally expand a portion of the inner coating layer 20A to push the outer coating layer 20B away from the glass portion 18. The outer coating layer 20B is thereby disengaged from the glass portion 18. In this manner, the coating 20 may facilitate efficient thermal removal.

Specifically, in one non-limiting embodiment, the inner coating layer 20A may expand and/or boil to thereby fracture the outer coating layer 20B. The outer coating layer 20B may or may not be changed to a non-solid state by heat from the ferrule 14. Then, as the glass portion 18 of the optical fiber 12 is pushed into the ferrule bore 22, the coating 20 is pushed from (or shucked off) the optical fiber 12 with the at least one rear surface 28 of the ferrule 14 to remain outside the ferrule bore 22. In this specific non-limiting embodiment, the coating 20 may be thermally removed from the optical fiber 12.

With reference back to FIG. 4A, the ferrule assembly 16 includes the glass portion 18 of the end portion 10 of the optical fiber 12 coupled to the inner surface 42 of the ferrule 14. FIG. 4C is a cutaway view, parallel to the optical axis $A_1$ of the ferrule assembly 16 of FIG. 4A, showing the end portion 10 of the optical fiber 12 and with the coating 20 thermally removed, or substantially thermally removed, consistent with the process of FIG. 2. The exterior surface 58 of the glass portion 18 of the optical fiber 12 may be in abutment with the inner surface 42 of the ferrule 14. Additionally, the bonding agent 48 may secure the glass portion 18 of the optical fiber 12 to the inner surface 42 of the ferrule 14. In this manner, the optical fiber 12 may be secured and precisely located within the ferrule 14.

Figure 5A:
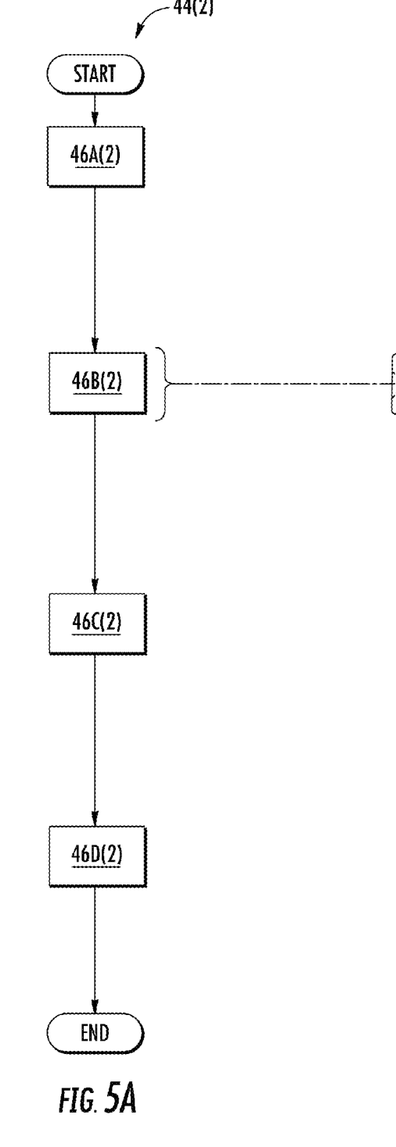
FIG. 5A is a flowchart diagram of another exemplary process of terminating an optical fiber at a ferrule to create a ferrule assembly for a fiber optic connector by inserting the coated end portion of the optical fiber into the ferrule bore through the rear opening of the heated ferrule to remove the coating at the end portion of the optical fiber.

Other processes can be employed to prepare the ferrule assembly 16 for the fiber optic connector sub-assembly 60 for thermal removal of the coating 20 of the end portion 10 of the optical fiber 12 by inserting the coated end portion 10 of the optical fiber 12 into the ferrule bore 22 through the rear opening 24 of the ferrule 14, which has been heated. In this regard, FIG. 5A is a flowchart diagram of another process 44(2) of terminating the optical fiber 12 at the ferrule 14 to create the ferrule assembly 16 for the fiber optic connector sub-assembly 60. The process 44(2) is similar to the process 44(1) discussed above, and only the differences will be explained for clarity and conciseness.

Figure 5B:
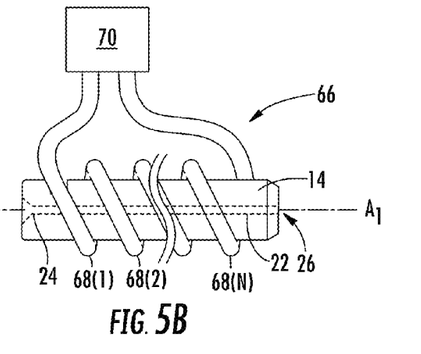
FIG. 5B is a side view of the ferrule of FIG. 1A surrounded by an electromagnet illustrating heating the ferrule above the initial temperature via induction heating, consistent with the process of FIG. 5A.

In this regard, the process 44(2) comprises blocks 46A(2)-46D(2), which may be similar to the blocks 46A(1)-46D(1) of the process 44(1), except the block 46B(2) comprises induction heating the ferrule 14 with an electromagnet 66 disposed around the ferrule 14. The electromagnet 66 may comprise at least one coil 68(1)-68(N) disposed around the ferrule 14. The electromagnet 66 may be coupled to an electrical current source 70 to provide alternating current to the electromagnet 66 and thereby inductively heat the ferrule 14. Specifically, in one embodiment, the ferrule 14 may comprise zirconia, or other materials, that may be inductively heated and thereby eddy currents may be induced by the electromagnet 66. Electrical resistance of the material to the eddy currents leads to inductive heating of the ferrule 14. In this manner, the ferrule 14 may be heated above a temperature sufficient to change the coating 20 on the coated end portion 10 of the optical fiber 12 to a non-solid state.

Figure 6A:
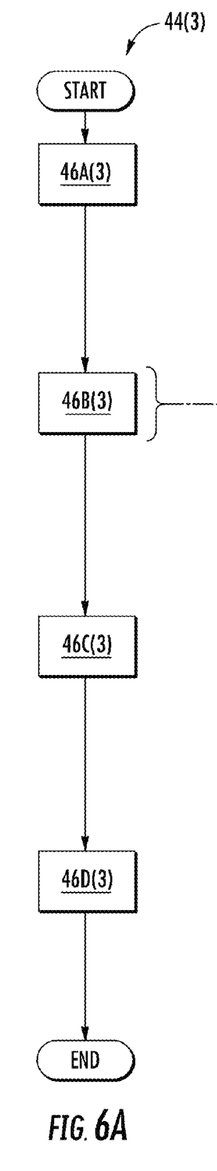
FIG. 6A is a flowchart diagram of another exemplary process of terminating an optical fiber at a ferrule to create a ferrule assembly for a fiber optic connector.

Other processes can be employed to prepare the ferrule assembly 16 for the fiber optic connector sub-assembly 60 for thermal removal of the coating 20 of the end portion 10 of the optical fiber 12 by inserting the coated end portion 10 of the optical fiber 12 into the ferrule bore 22 through the rear opening 24 of the ferrule 14, which has been heated. In this regard, FIG. 6A is a flowchart diagram of another process 44(3) of terminating the optical fiber 12 at the ferrule 14 to create the ferrule assembly 16 for the fiber optic connector sub-assembly 60. The process 44(3) is similar to the process 44(1) discussed above, and only the differences will be explained for clarity and conciseness.

Figure 6B:
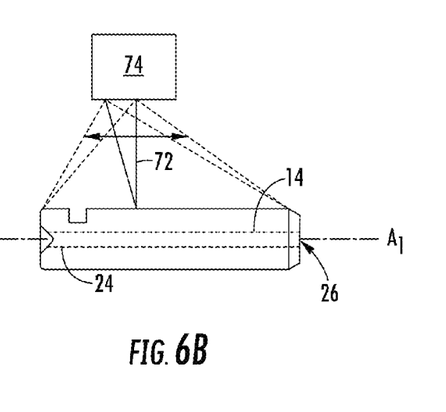
FIG. 6B is a side view of the ferrule of FIG. 1A with a laser beam incident thereon illustrating heating the ferrule to the elevated temperature via laser energy, consistent with the process of FIG. 6A.

In this regard, the process 44(3) comprises blocks 46A(3)-46D(3), which may be similar to the blocks 46A(1)-46D(1) of the process 44(1), except the block 46B(3) comprises heating the ferrule 14 by directing a laser beam 72 emitted from a laser 74 to be incident upon the ferrule 14. The laser beam 72 may include a wavelength in a range from one-hundred fifty-seven (157) nanometers to 10.6 microns, and preferably at a wavelength of 9.3 microns for efficient absorption by the coating 20.

At least some of the energy of the laser beam 72 incident upon the ferrule 14 will be absorbed by the ferrule 14. In this manner, the ferrule 14 may be heated above a temperature sufficient to change the coating 20 on the coated end portion 10 of the optical fiber 12 to a non-solid state. The laser 74 may be, for example, a carbon dioxide laser emitting the laser beam 72 with a wavelength $\lambda$ of 9.3 microns. In one embodiment, the laser 74 may be a Diamond™ C-20A laser manufactured by Coherent Incorporated of Santa Clara, Calif.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method of terminating an optical fiber at a ferrule to create a ferrule assembly for a fiber optic connector, comprising:

providing a ferrule at an initial temperature, the ferrule comprising a ferrule bore extending from a rear opening to a front opening;

heating the ferrule above the initial temperature with a heater device; and inserting a coated end portion of an optical fiber through the rear opening of the ferrule bore while the ferrule is heated above the initial temperature sufficient to change a coating on the coated end portion of the optical fiber to a non-solid state to thermally remove or substantially thermally remove the coating from the coated end portion of the optical fiber passing through the rear opening of the ferrule; and disposing a bonding agent into the ferrule bore prior to the inserting of the coated end portion of the optical fiber.

2. The method of claim 1, wherein the heating the ferrule comprises heating the ferrule above the initial temperature sufficient to thermally oxidize the coating.

3. The method of claim 1, wherein the heating the ferrule comprises heating the ferrule above three-hundred (300) degrees Celsius.

4. The method of claim 1, wherein the heating the ferrule comprises directing a laser beam emitted from a laser to be incident upon the ferrule.

5. The method of claim 4, wherein the heating the ferrule comprises directing the laser beam having a wavelength in a range from one-hundred fifty-seven (157) nanometers to 10.6 microns.

6. The method of claim 2, wherein the heating the ferrule comprises induction heating the ferrule with an electromagnet disposed around the ferrule.

7. The method of claim 2, wherein the heating the ferrule above the initial temperature comprises heating the ferrule with an electromagnet disposed around at least a rear end of the ferrule.

8. The method of claim 1, further comprising accumulating at least a portion of the coating removed from the coated end portion of the optical fiber to form a supporting body for the optical fiber adjacent to the ferrule.

9. The method of claim 8, wherein the accumulating comprises at least partially filling a cone-shaped space of the ferrule adjacent to the rear opening with the at least a portion of the coating removed.

10. The method of claim 1, wherein the removing the coating of the coated end portion of the optical fiber comprises removing the coating so that at least twenty-five (25) percent of an exterior surface of a glass portion of the end portion of the optical fiber disposed within the ferrule bore is free of coating.

11. The method of claim 1, wherein the disposing the bonding agent into the ferrule bore comprises injecting the bonding agent into the ferrule bore with a syringe.

12. The method of claim 1, wherein the ferrule comprises zirconia.

13. The method of claim 1, wherein the coating comprises a polymer including acrylate.

14. The method of claim 1, wherein the thermally removing or substantially thermally removing the coating comprises:

heating with the ferrule an inner layer of the coating to thereby fracture an outer layer of the coating by thermally expanding the inner coating layer or changing the inner coating layer to the non-solid state; and pushing the coating from the optical fiber with a rear surface of the ferrule.

15. The method of claim 1, wherein the removing the coating comprises removing an inner layer of coating and an outer layer of coating, and the inner layer and the outer layer comprise different material compositions.

16. The method of claim 1, wherein a maximum width of the end portion of the optical fiber with the coating thermally removed or substantially thermally removed is within ten (10) nanometers of a minimum width of the ferrule bore.

17. The method of claim 1, wherein a thickness of the coating on the coated end portion is at least twenty (20) microns.

18. A method of terminating an optical fiber at a ferrule to create a ferrule assembly for a fiber optic connector, comprising:

providing a ferrule at an initial temperature, the ferrule comprising a ferrule bore extending from a rear opening to a front opening;

heating the ferrule above the initial temperature with a heater device; and inserting a coated end portion of an optical fiber through the rear opening of the ferrule bore while the ferrule is heated above the initial temperature sufficient to change a coating on the coated end portion of the optical fiber to a non-solid state to thermally remove or substantially thermally remove the coating from the coated end portion of the optical fiber passing through the rear opening of the ferrule;

wherein the heating the ferrule comprises heating the ferrule above the initial temperature sufficient to thermally oxidize the coating.

19. A method of terminating an optical fiber at a ferrule to create a ferrule assembly for a fiber optic connector, comprising:

providing a ferrule at an initial temperature, the ferrule comprising a ferrule bore extending from a rear opening to a front opening;

heating the ferrule above the initial temperature with a heater device; and inserting a coated end portion of an optical fiber through the rear opening of the ferrule bore while the ferrule is heated above the initial temperature sufficient to change a coating on the coated end portion of the optical fiber to a non-solid state to thermally remove or substantially thermally remove the coating from the coated end portion of the optical fiber passing through the rear opening of the ferrule, wherein the thermally removing or substantially thermally removing the coating comprises:

heating with the ferrule an inner layer of the coating to thereby fracture an outer layer of the coating by thermally expanding the inner coating layer or changing the inner coating layer to the non-solid state; and pushing the coating from the optical fiber with a rear surface of the ferrule.

* * * * *